Jan. 3, 1928.
M. B. HAMMOND
1,654,543
SUPPORT FOR VEHICLE BUMPERS
Filed Dec. 6, 1926
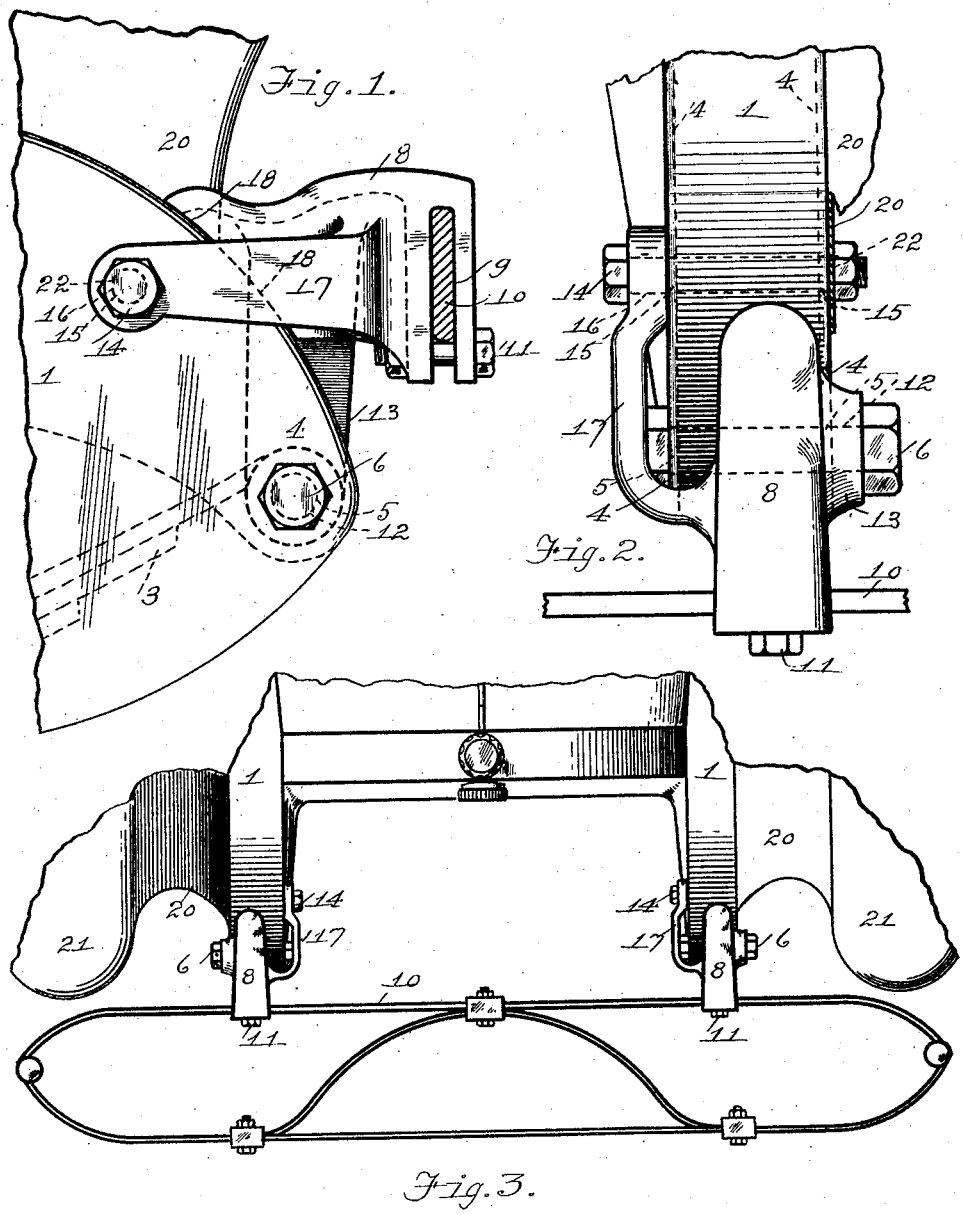
INVENTOR
Milton B. Hammond
BY
Cyrus W. Rice
ATTORNEY
Witness:

Patented Jan. 3, 1928.

1,654,543

UNITED STATES PATENT OFFICE.

MILTON B. HAMMOND, OF GRAND RAPIDS, MICHIGAN, ASSIGNOR TO WOLVERINE BUMPER & SPECIALTY COMPANY, OF GRAND RAPIDS, MICHIGAN, A CORPORATION OF MICHIGAN.

SUPPORT FOR VEHICLE BUMPERS.

Application filed December 6, 1926. Serial No. 152,909.

The present invention relates to supports for vehicle bumpers; and its object is, generally, to provide an improved device of that character which may be readily mounted on the vehicle; and, more particularly, to provide such a device adapted to be mounted on an automobile having frame members provided with offset bolt-receiving openings therethrough.

This and any other and more specific objects hereinafter appearing are attained by, and the invention finds preferable embodiment in, the device hereinafter particularly described in the body of this specification and illustrated by the accompanying drawings, in which:—

Figure 1 is a side view of one of the members or elements of a bumper support and of the forward end of the vehicle's frame member whereon said element is mounted;

Figure 2 is a top plan view thereof; and

Figure 3 is a top plan view of the forward portion of an automobile, the bumper support mounted thereon and the bumper carried by the support.

In the accompanying drawings, a support for a bumper of any usual type, such as that seen in Figure 3, is shown mounted on the forward ends of the spaced frame members 1 of an automobile, such members extending in the automobile's longitudinal direction. The front ends of these frame members are supported by the vehicle springs indicated at 3 and carried by the automobile's front axle, the downwardly-extending spaced ears 4 of said members having openings 5 receiving the bolts 6 which, passing through the curled ends of said springs, serve to connect the springs and frame members together.

The bumper support comprises a pair of members, the elements 8, each having at its front portion suitable means for securing a bumper (as the bumper shown in Figure 3) thereto, such means in the illustrated construction being the recess 9 receiving the rear bar 10 of the bumper which is clamped in the recess by a threaded bolt 11. Each of the elements 8 has means for detachably mounting it on the automobile, such means, as shown, comprising said bolt 6 extending through the frame member's openings 5 and through a registering opening 12 formed in the downwardly-extending arm 13 of said element, which arm extends along one side of the frame member. Said mounting means comprises also a second bolt 14 extending through openings 15 in the frame member offset from said member's openings 5, this second bolt extending also through a registering opening 16 formed in the rearwardly-extending arm 17 of said element 8, this arm 17 extending along the opposite side of the frame member. These elements 8 have a concave under portion 18 abutting in the assembled position of the parts on the forward end of the frame members respectively and located between the arms 13 and 17.

It will be seen that this disposition of said arms on the opposite sides of the frame members respectively, and also the abutting of the intermediate portion 18 of each element 8 on the frame member provides a very stable and rigid mounting of the bumper elements.

Automobiles are, as shown in the drawings, frequently provided with metallic sheets or aprons 20 extending from the sides of the frame members upwardly and connected to the fenders 21. In the illustrated construction these sheets or aprons have openings indicated at 22 registering with the openings 15 through the frame members and the openings 16 through the arms 17 of the elements 8, the bolts 14 passing through said registering openings 22, 15 and 16 to securely hold these parts together.

It will be seen that this bumper support may be readily mounted on and demounted from the automobile, and in mounted position is held against turning in a vertical plane by the offset relation of the bolts 6 and 14.

The invention being intended to be pointed out in the claims, is not to be limited to or by details of construction of the particular embodiment thereof illustrated by the drawings or hereinbefore described.

I claim:

1. In combination with a vehicle having spaced longitudinally-extending frame members supported by springs and having openings receiving bolts connecting the springs with said members and other openings offset from the first-mentioned openings, a bumper support comprising: a pair of elements having means for securing a bumper thereto, portions abutting the forward ends of said members, openings receiving the bolts, and other openings registering with said members' second-mentioned openings and receiving bolts connecting said elements and said members.

2. In combination with a vehicle having spaced longitudinally-extending frame members provided with offset openings, a bumper support comprising: a pair of elements each having means for securing a bumper thereto, an arm extending along one side of one of said members provided with an opening registering with one of the openings of said member, and an arm extending along the opposite side of said member provided with an opening registering with said member's other opening; bolts receiving in the registering openings for connecting said members and elements.

3. In combination with a vehicle having spaced longitudinally-extending frame members provided with offset openings and upwardly-extending metallic sheets provided with openings registering with one of the openings of said members, a bumper support comprising: a pair of elements each having means for securing a bumper thereto, an arm extending along one side of one of said members provided with an opening registering with the opening of one of the sheets and with one of the openings of said member, and an arm extending along the opposite side of said member provided with an opening registering with said member's other opening; bolts received in the registering openings for connecting said members, sheets and elements.

In testimony whereof I have hereunto set my hand at Grand Rapids, Michigan, this 29th day of November, 1926.

MILTON B. HAMMOND.